Aug. 27, 1929.  J. ZUBATY  1,726,518
SPEEDOMETER CALIBRATION
Filed July 31, 1926

Inventor
Joseph Zubaty
By Blackmore, Spencer & Finch
Attorneys

Patented Aug. 27, 1929.

1,726,518

UNITED STATES PATENT OFFICE.

JOSEPH ZUBATY, OF FLINT, MICHIGAN, ASSIGNOR TO A C SPARK PLUG COMPANY, OF FLINT, MICHIGAN, A COMPANY OF MICHIGAN.

SPEEDOMETER CALIBRATION.

Application filed July 31, 1926. Serial No. 126,193.

This invention is concerned with improvements in magnetically operable instruments. More specifically, it aims to make an improvement in speedometers for vehicles.

The primary object of the invention is to provide convenient means for the calibration of an instrument of the kind described. Broadly stated, such instruments employ a rotating indicating member, the extent of rotation being the measure of the speed of the vehicle. The extent of rotation is in part dependent upon the intensity of the magnetic flux between the poles of the magnet acting upon an armature rotating between the poles. It is a particular object of the invention to modify that controlling magnetic flux by providing means for moving the magnet so that its poles approach or recede from the rotating armature and also approach or recede from the casing which serves as a shunt.

Figure 1:
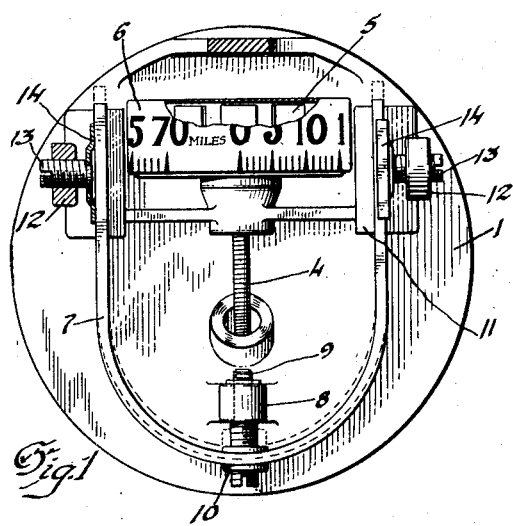
Figure 2:
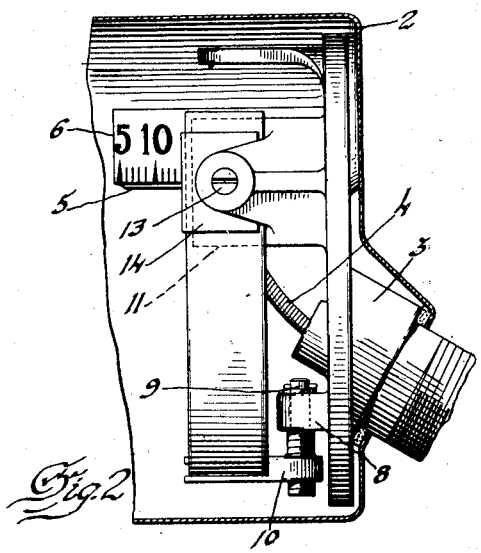
Figure 3:
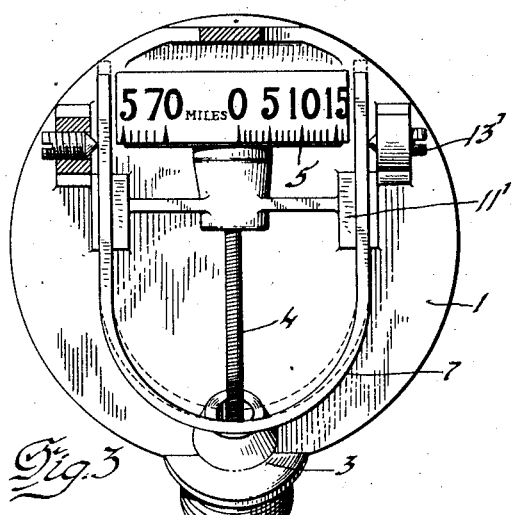
Figure 4:
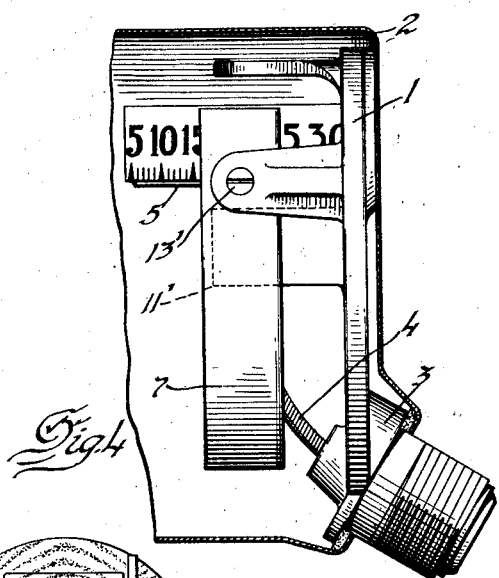
Figure 5:
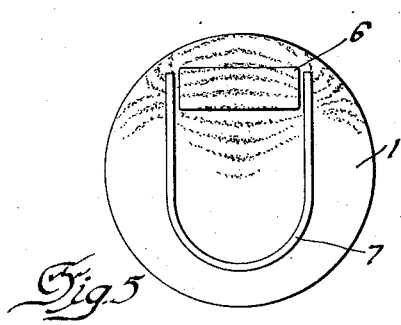
Figure 6:
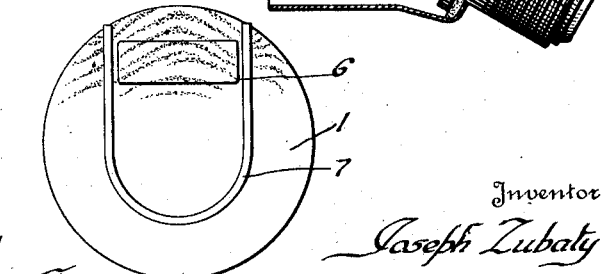

For a complete understanding reference is made to the following specification and the accompanying drawing. In the drawing, Figure 1 is an elevation of the speedometer with the cover removed, facing the back frame. Figure 2 is a side elevation. Figure 3 is a view similar to Figure 1, showing a modification. Figure 4 is a side elevation of the form shown in Figure 3. Figures 5 and 6 are diagrammatic views to illustrate the effects upon the armature and indicating element caused by moving the magnet.

Referring particularly to the drawing, numeral 1 indicates a frame or base and numeral 2 indicates a casing which incloses the operating parts. It should be explained that the casing in my speedometer is of steel. This steel casing functions to protect the operating parts from outside interference as from steel parts, electric wire, etc. This case decreases the intensity of the flux going across the rotating armature and speed indicating element. The degree of this shunt however depends upon the air gap between the magnet and the end of the case.

Extending outwardly through the back of frame 1 is an apertured lug 3 for the attachment of the casing of flexible speedometer shafts. Through the casing passes the shaft 4 which operates the rotating armature 5 and is connected at its other end to the part the speed of which is to be measured. Numeral 6 represents an indicating member, the rotation of which is produced by the rotation of the armature between the poles of the magnet 7 in a manner which is well understood.

The speed reading on the indicating cup is directly proportional to the intensity of the magnetic flux crossing the cup and the iron rotating armature within it. In order to calibrate the instrument I therefore propose to move the magnet bodily so that the intensity of the magnetic field across the rotor and the indicating element may be varied. For the purpose of moving the magnet I employ at the lower portion of the frame and within the casing a lug 8. Rotatable within the lug 8 is a pin 9, the lower end of which is threaded and engages the threaded opening in the forked plate 10. The fork of this plate straddles the lower part of the magnet 7, as is perhaps best shown in Figure 2. It will be understood that when pin 9 is rotated, member 10 with the magnet will be moved either upwardly or downwardly. If moved so that the extremities of the magnet lie diametrically across the rotating armature and speed indicating element, the magnetic field serving to effect rotation will be at its maximum. In this position also the ends of the magnet are considerably removed from the steel casing with the result that the efficiency of the magnetic field is not diminished by the shunt occasioned by the steel casing. If, however, the part 10 is turned up and the poles of the magnet moved up towards the casing and away from the indicating element, the effective magnet field is diminished, both because the poles are removed from the rotating armature and indicating element and because they are brought into position where the casing serves more effectively as a shunt.

In its various positions it is quite necessary that the sides of the magnet shall at all times be equally positioned from the indicating element. For that purpose the base of frame member 1 is provided with ways 11. The magnet rests against the outer face of these ways and its edge adjacent the frame also engages a surface provided on the ways. On the outer sides of the magnet arms are lugs 12 through which set screws 13 are positioned. These screws engage guide members 14 which lie against the outer face of the magnet and also against the edge as shown in Figure 1.

By the arrangement described it will be seen that when the magnet is to be adjusted the set screws 13 are loosened and the magnet is then free to slide between the ways 11 and the guides 14 under the action of the rotatable pin 9. During such adjusting movements, the magnet slides freely but is nevertheless held from movement to or from the rotating armature and indicating element. When the position of adjustment is reached the set screw is turned thereby holding the magnet firmly in the desired position.

A modified form is shown in Figure 3 and Figure 4 which form operates in the same general manner but is much simpler than that before described. In this form guides 14 are omitted and the set screw 13′ functioning in the same way as set screw 13 in Figure 1 engages the magnet directly. The adjusting arrangement shown in Figure 1 by numerals 8, 9 and 10 is not made use of in this simpler form. In this modification when it is desired to adjust the magnet the set screws 13′ are turned back, the magnet adjusted to the desired position and the set screws 13′ tightened up. The proper spacing of the magnet relative to the indicating element is however obtained here by the use of the ways 11′ co-operating with the set screw 13′ substantially as in the other form.

Figures 5 and 6 illustrate diagrammatically the effect produced when the magnet is moved. Figure 5 shows what may be called "fast" position. Here the greater part of the lines of force pass across the rotating armature and the magnetic field effective to produce rotation is comparatively strong. Figure 6 I may call the "slow" position. Here the poles are somewhat removed from the rotating elements and also they are in close proximity to the casing, which, as explained above, serves as a shunt, thereby reducing the effectiveness of the magnet field on the rotating element.

I claim:

1. An indicating instrument including a frame, a magnet and a rotating indicating member influenced thereby, means to move the magnet bodily, the frame having ways along which the magnet may slide, the frame having lugs on the side of the magnet arms opposite to the ways, means associated with said lugs to co-operate with the ways to guide the magnet and to clamp the magnet in adjusted position.

2. The invention defined by claim 1, said last named means including set screws in said lugs and guides engaged by the set screws and held thereby against the sides of the magnet.

3. An indicating instrument comprising a magnet and a rotary indicating member influenced thereby, a casing of magnetic material enclosing said magnet and rotary member, means to bodily adjust said magnet so that the position of its poles is changed relative to the rotary indicating member and to the casing whereby the casing acts as a variable shunt to vary the intensity of the active interpolar gap.

In testimony whereof I affix my signature.

JOSEPH ZUBATY.